US008515579B2

(12) United States Patent
Alcazar et al.

(10) Patent No.: US 8,515,579 B2
(45) Date of Patent: Aug. 20, 2013

(54) SYSTEMS AND METHODS ASSOCIATED WITH HANDLING AN OBJECT WITH A GRIPPER

(75) Inventors: Javier A Alcazar, Royal Oak, MI (US); Leandro G. Barajas, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 826 days.

(21) Appl. No.: 12/634,313

(22) Filed: Dec. 9, 2009

(65) Prior Publication Data

US 2011/0137463 A1 Jun. 9, 2011

(51) Int. Cl.
*G05B 19/00* (2006.01)
*G05B 15/00* (2006.01)

(52) U.S. Cl.
USPC .......................................... 700/259; 700/258

(58) Field of Classification Search
None
See application file for complete search history.

(56) References Cited

U.S. PATENT DOCUMENTS

| 4,132,318 | A | * | 1/1979 | Wang et al. .................... 414/591 |
| 4,478,089 | A | | 10/1984 | Aviles et al. |
| 4,766,389 | A | | 8/1988 | Rhoades et al. |
| 4,980,626 | A | | 12/1990 | Hess et al. |
| 5,673,367 | A | | 9/1997 | Buckley |
| 5,871,248 | A | * | 2/1999 | Okogbaa et al. ............. 294/86.4 |
| 5,987,164 | A | * | 11/1999 | Szeliski et al. ................ 382/154 |
| 6,018,349 | A | * | 1/2000 | Szeliski et al. ................ 345/629 |
| 6,078,846 | A | | 6/2000 | Greer et al. |
| 6,097,854 | A | * | 8/2000 | Szeliski et al. ................ 382/284 |
| 6,188,331 | B1 | * | 2/2001 | Zee et al. ......................... 341/34 |
| 6,788,802 | B2 | * | 9/2004 | Chiba et al. .................. 382/107 |
| 7,340,323 | B2 | | 3/2008 | Zhang et al. |
| 7,984,658 | B2 | * | 7/2011 | Kishida et al. ........... 73/862.391 |
| 2007/0074584 | A1 | | 4/2007 | Talarico et al. |
| 2007/0239315 | A1 | * | 10/2007 | Sato et al. ...................... 700/245 |
| 2009/0031825 | A1 | * | 2/2009 | Kishida et al. ........... 73/862.621 |

FOREIGN PATENT DOCUMENTS

| DE | 10354526 A1 | 6/2005 |
| JP | 59095405 A | 6/1984 |
| JP | 9081205 A | 3/1997 |
| JP | 41989484 A | 9/2008 |
| JP | 2009-66683 | 4/2009 |
| JP | 2009-69028 | 4/2009 |
| SU | 2374660 A1 | 12/1978 |

* cited by examiner

*Primary Examiner* — Ian Jen
(74) *Attorney, Agent, or Firm* — Parks IP Law LLC

(57) ABSTRACT

A system associated with handling an object with a gripper includes a sensor that is configured to measure spatially distributed data that represents the position of the object that is handled by the gripper. The system further includes a computing unit that is configured to determine the behavior of the object.

16 Claims, 4 Drawing Sheets

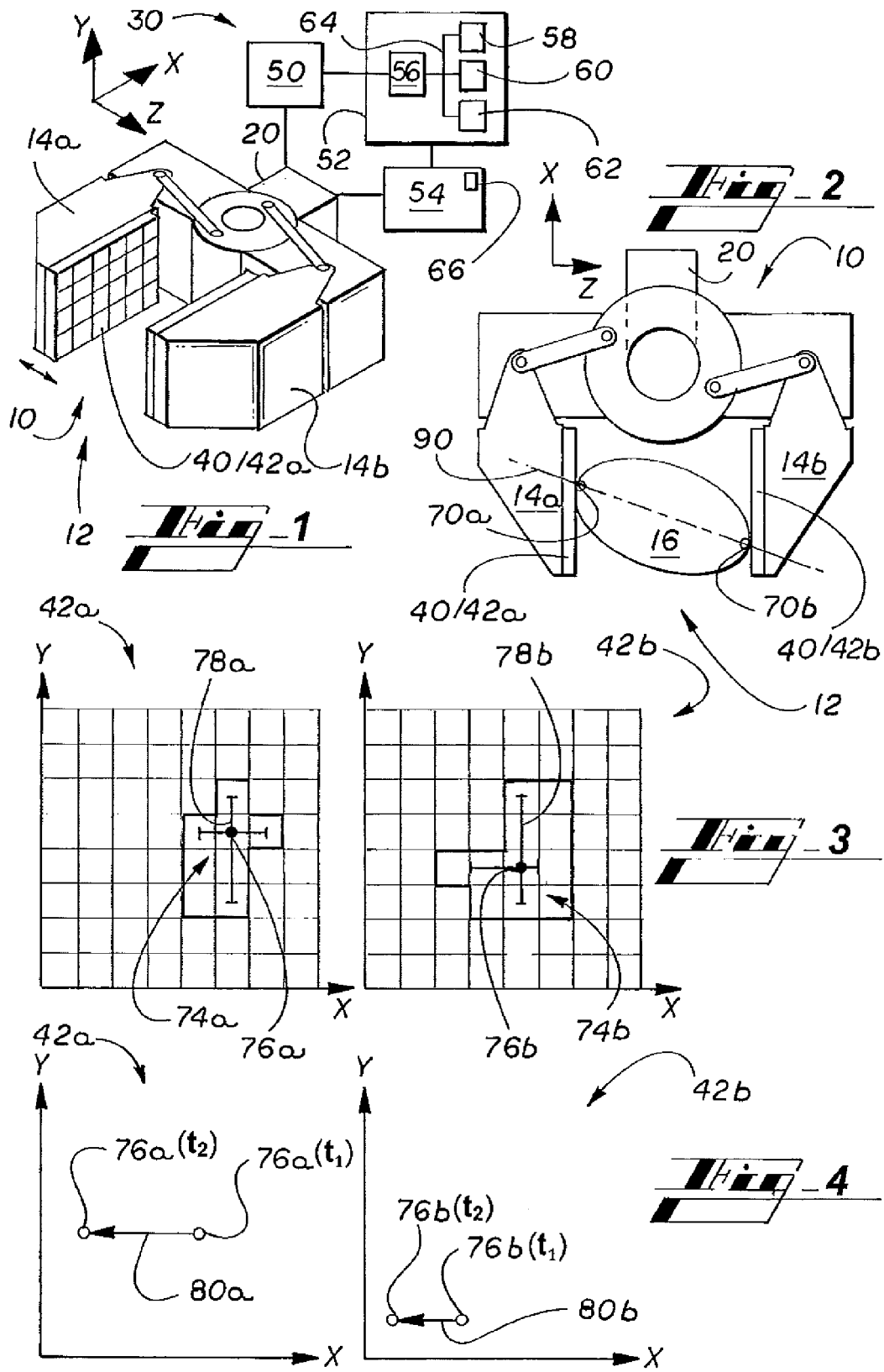

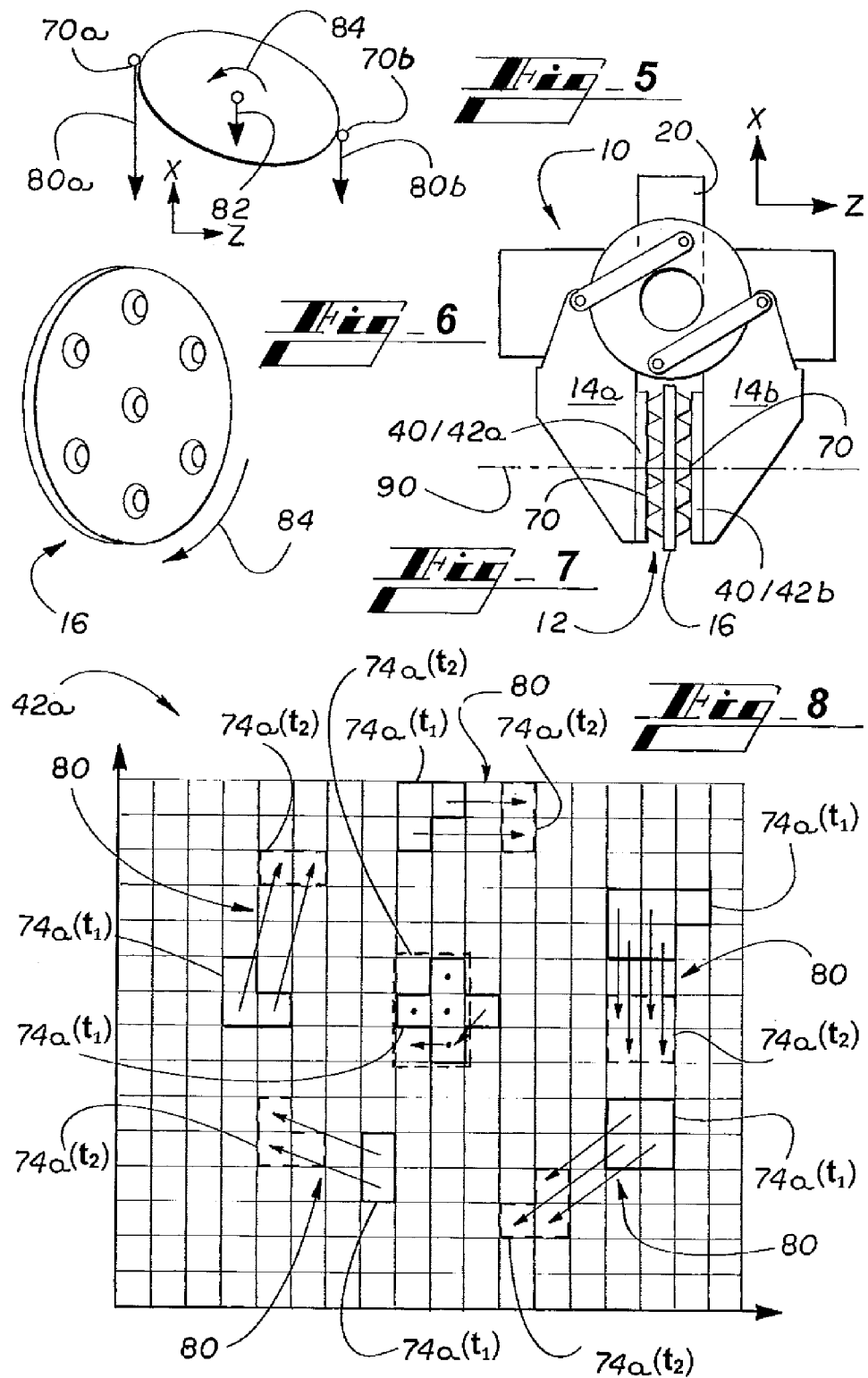

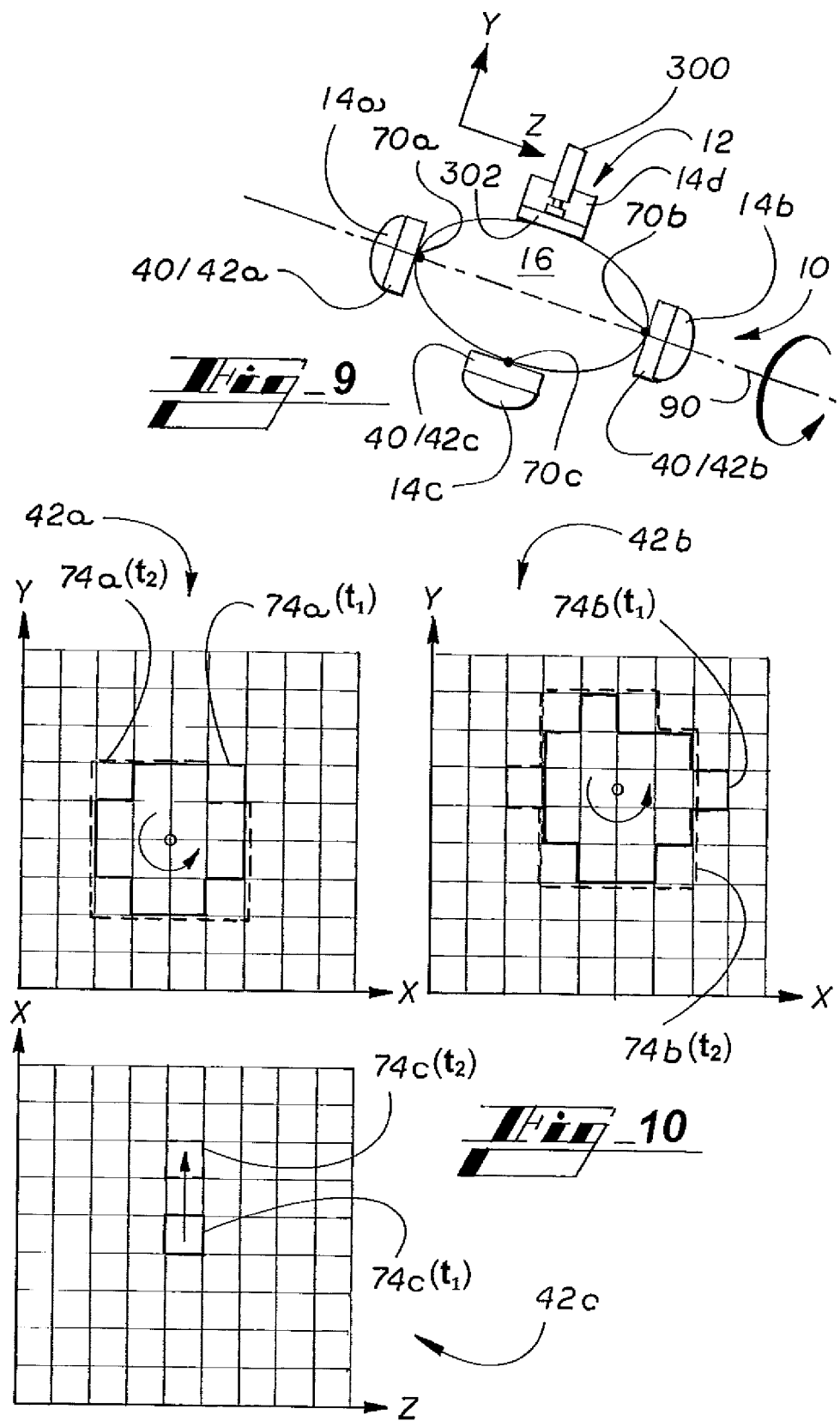

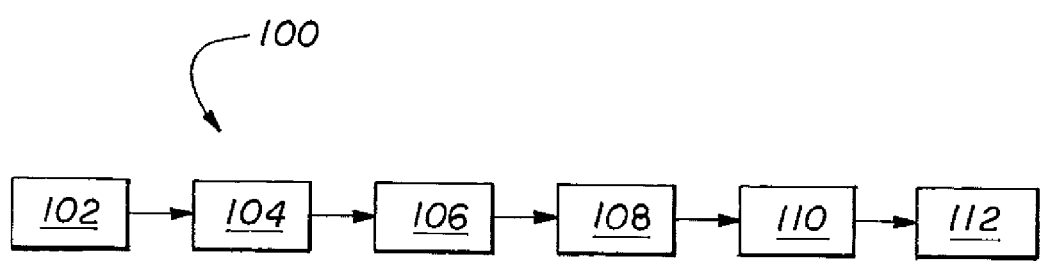
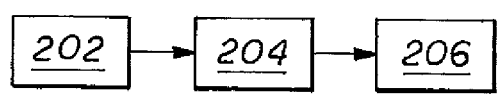

SYSTEMS AND METHODS ASSOCIATED WITH HANDLING AN OBJECT WITH A GRIPPER

TECHNICAL FIELD

This disclosure relates generally to systems and methods associated with handling an object with a robot gripper.

BACKGROUND

Currently used systems and methods do not fully determine the gripping conditions or behavior of an object when handling an object with a gripper. Specific knowledge of the behavior of a gripped object is useful when controlling the gripper to accomplish assembly tasks. Therefore, a heretofore unaddressed need exists in the industry to address the aforementioned deficiencies and inadequacies.

SUMMARY

The various embodiments of the present disclosure overcome the shortcomings of the prior art by providing systems and methods for determining the grip conditions or behavior of an object that is gripped and for controlling a gripper based on the behavior of the object.

According to an exemplary embodiment, a system associated with handling an object with a gripper includes a sensor that is configured to measure the magnitude of a parameter that represents the position of an object that is handled by the gripper. The system also includes a computing unit that includes a memory for storing computer readable instructions and a processor for executing the computer readable instructions. The computer readable instructions include determining a vector field where the vector field is a function of change in spatially distributed data over space and time and where the spatially distributed data is measured with the sensor. The computer readable instructions also include determining the behavior of the object as a function of the vector field where the behavior of the object includes at least one of a three-dimensional translational vector and a three-dimensional rotational vector.

The foregoing has broadly outlined some of the aspects and features of the present disclosure, which should be construed to be merely illustrative of various potential applications. Other beneficial results can be obtained by applying the disclosed information in a different manner or by combining various aspects of the disclosed embodiments. Accordingly, other aspects and a more comprehensive understanding may be obtained by referring to the detailed description of the exemplary embodiments taken in conjunction with the accompanying drawings, in addition to the scope defined by the claims.

DESCRIPTION OF THE SEVERAL VIEWS OF THE DRAWINGS

FIG. 1 is a schematic illustration of a robotic gripper and a system for determining behavior of an object and for controlling the gripper, according to an exemplary embodiment of the disclosure.

FIG. 2 is a plan view of the robotic gripper of FIG. 1 as it engages an object.

FIG. 3 is a graphical illustration of spatially distributed pressure data associated with points of contact between the gripper and the object of FIG. 2.

FIG. 4 is a graphical illustration of vectors associated with movement of the spatially distributed data of FIG. 3.

FIG. 5 is a plan view of the object of FIG. 2 illustrating the vectors of FIG. 4 and vectors that represent the behavior of the object.

FIG. 6 is a perspective view of an alternative object according to an exemplary embodiment of the disclosure.

FIG. 7 is a plan view of the robotic gripper of FIG. 1 as it engages the object of FIG. 6.

FIG. 8 is a graphical illustration of spatially distributed data and vectors associated with movement of the spatially distributed data.

FIG. 9 is a schematic illustration of an alternative robotic gripper as it engages an object.

FIG. 10 is a graphical illustration of spatially distributed data and vectors associated with movement of the spatially distributed data.

FIG. 11 is a flow diagram of an exemplary method of determining grip conditions or the behavior of an object.

FIG. 12 is a flow diagram of an exemplary method of determining instructions for controlling a gripper.

DETAILED DESCRIPTION

As required, detailed embodiments are disclosed herein. It must be understood that the disclosed embodiments are merely exemplary of the teachings that may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods being known to those of ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

As used herein the term "gripper" refers to a device or end-effector for robotic prehension or otherwise for gripping or handling of an object or material. Categories of robot grippers generally include impactive, ingressive, astrictive, and contigutive. Impactive grippers include jaws or claws that physically grasp the object. Ingressive grippers include pins, needles, or hackles that physically penetrate the surface of the object. Ingressive grippers are used in textile, carbon, and glass fiber handling. Astrictive grippers apply suction forces to the surface of the object including vacuum, magneto-adhesion, and electro-adhesion forces. Contigutive grippers apply adhesion to an object using, for example, glue, surface tension, or freezing. The terms "gripper", "fingers" and "hand" can be used interchangeably. Exemplary grippers include robotic grippers, parallel jaw grippers, 3-jaw pneumatic parallel grippers, angular grippers, concentric grippers, the Rutgers hand, the Twendy-One hand, the WillowGarage hand, the RECOM-II gripper, the BarrettHand™, the DLR hand, the NASA Robonaut hand, suction cups, hooks, combinations thereof, and the like.

As used herein, the term "actuator" includes any device that transforms energy into some kind of motion or action. Exemplary actuators include electric motors, relays, solenoids, piezoelectric, smart materials, hydraulic pistons, electro-active polymers, combinations thereof, and the like.

As used herein, the terms "sensor" and "sensor array" include, but are not limited to a device or combination of devices that are configured to measure spatially distributed data. Excitation of such sensors can be due to pressure, temperature, magneto-resistivity, proximity, color, images, distance, combinations thereof, and the like. Spatially distributed data is collected over time such that a data stream is both spatially and temporally distributed. The term "spatially distributed data" refers to data measured by a sensor or sensor array for different positions on the object or on the gripping surface of a gripper. Exemplary sensors include spatially distributed pressure systems, skin sensors, optical sensors, cameras, infrared sensors, electromagnetic field sensors, ultrasonic sensors, laser scans, combinations thereof, and the like.

As used herein, the term "grip condition" or the "behavior of an object" refers to the state of an object as it is handled by the gripper. Grip conditions can include non-slip, slip, rotation, and other movements or displacements of an object relative to a gripping or handling surface. Characteristics or parameters that represent movements include three-dimensional translational velocity vectors, rotational velocity vectors, direction of translation, magnitude of translation, direction of rotation, magnitude of rotation, axis of rotation, orientation, combinations thereof, and the like.

Exemplary systems and methods are now described in the context of a robot used for automobile assembly although the systems and methods are applicable in other contexts. Referring to FIGS. 1 and 2, a robotic gripper 10 includes a jaw 12 with parallel fingers 14a, 14b that are configured to grip an object 16 such as an automobile part. The opening and closure of the jaw 12 are driven by a servomotor 20. Jaw 12 has a single degree of freedom in that the parallel fingers 14a, 14b move toward and away from one another in the z-direction. In alternative embodiments, grippers have multiple degrees of freedom and are controlled by one or more actuators. For example, referring to a gripper 10 shown in FIG. 9, each finger 14a, 14b, 14c, 14d is individually controlled by a servomotor (not shown). In other embodiments, fingers have multiple phalanges that are individually or synchronously controlled.

Continuing with FIGS. 1 and 2, a system 30 for determining grip conditions includes a sensor array 40 that is associated with a gripping surface of the jaw 12, data acquisition equipment 50, a computing unit 52, and gripper control equipment 54. The illustrated sensor array 40 is an array of pressure sensors that includes two sub-arrays that are associated with the gripping surface of the fingers 14a, 14b. A first sub-array 42a is associated with the gripping surface of first finger 14a and a second sub-array 42b is associated with the gripping surface of second finger 14b. As used herein, the term "sub-array" refers to portions of a sensor array that are distinguished from one another either physically or computationally. For example, sub-arrays 42a, 42b are associated with independently moveable parts of the gripper 10.

For purposes of illustration, the sub-arrays 42a, 42b are each an N row×M column grid of square-shaped sensors. In alternative embodiments, sub-arrays are otherwise shaped to fit the gripping surfaces of a gripper. The shape or sensing area of sensors is not limited to square but can rather include sensors with hexagonal, triangular, or circular sensing areas. Further, sensor arrays can have sensors with different or non-uniform sensing areas. Here, different areas of the gripping surface can have different spatial resolutions. It should be noted that the sensor array is not required to be planar. In the first embodiment, the sub-arrays 42a, 42b are non-planar with respect to one another.

Gripping surface material is selected based on the desired frictional coefficient of the gripping surface and to protect the sensor array 40. For example, the gripping surface material may be silicone or another flexible material. A soft or compressible material generally provides data that is more spatially distributed and includes more noise. In contrast, a hard or less compressible material generally provides data that is less spatially distributed and includes less noise.

Referring momentarily to FIG. 9 the system 30 includes both a sensor array 40 associated with the gripping surface of the fingers 14a, 14b, 14c and a camera 300 that is associated with the gripping surface of finger 14d. The camera 300 is directed toward the object 16 with the camera 300 lens located behind a transparent gripping surface 302.

Continuing with FIG. 1, the data acquisition equipment 50 is configured to collect spatially distributed data from the sensor array 40, convert the data from analog to digital, and provide the digital data to the computing unit 52 where it is stored in memory 60. Each of the sensor sub-arrays 42a, 42b has integrated circuits (not shown) that convert the analog signals coming from the sub-array 42a, 42b into digital values over a serial inter-integrated circuit (I2C) protocol. The integrated circuits are connected to an I2C expander board (not shown) via I2C buses (not shown). The expander board is connected to a signal conditioning board (not shown) that initializes the sensor array 40 and transfers digital data to the computing unit 52 via a universal serial bus (USB) (not shown).

The computing unit 52 is configured to process a stream of data that is collected by the data acquisition equipment 50. Computing unit 52 includes computer components including a data acquisition unit interface 56, an operator interface 58, a processor 62, memory 60 for storing information, and a bus 64 that couples various system components including memory 60 to processor 62. Memory 60 is a computer readable medium that stores instructions for performing methods 100, 200 for determining grip conditions or behavior of an object and for controlling the gripper 10 described in further detail below. Processor 62 reads and executes the instructions. Operator interface 58 allows a user or other device to manipulate data; to select, change, or delete values of data or parameters; or to program computing unit 52 with new or different instructions.

Referring to FIG. 11, an exemplary method 100 of determining grip conditions or otherwise the behavior of the object 16 is now described. Method 100 includes a first step 102 where the data acquisition equipment 50 acquires a continuous stream of data from the sensor array 40 and provides associated digital data to the computing unit 52 substantially in real time. At a second step 104, the stream of data is mapped for each time step. In the exemplary embodiment illustrated with FIGS. 1-5, the computing unit 52 maps the data according to positions of the sensor array 40 sensors for each time step or otherwise according to the gripping surface of the gripper 10. In an exemplary embodiment illustrated with FIG. 9, the data images measured by the camera 300 are mapped to a position on the object 16 relative to the position of the camera 300. The mapping step 104 includes performing validation, scaling, calibration, and data integrity tests as well as spatial and temporal extrapolation and interpolation of data structures via virtual sensors. At a third step 106, the computing unit filters the data to remove the noise floor and the static measurement drift.

A next step 108 is placing the mapped data in a form that is useful for tracking changes in the data over time. For example, according to certain methods, the data is transformed using a two dimensional convolution or the like. Such a transformation also reduces noise. According to other methods, spatially distributed data is reduced to a position and/or distribution that can be used to characterize the movement of the data. The position of spatially distributed data can be represented by the position of a measured magnitude that is or represents the largest magnitude, the mean magnitude, the mode magnitude, the median magnitude, by the center of pressure, by the center of gravity, dominant areas of contact, combinations thereof, and the like. The distribution of spatially distributed data can represented by variance, standard deviation, range, interquartile range, mean difference, median absolute deviation, average absolute deviation, empirical probability distribution function (PDF), combinations thereof, and the like.

A next step 110 is determining the movement of mapped data over time. The movement of spatially distributed data is determined using optical flow, vector calculus, phase correlation, spectral coherence, block-based methods, discrete optimization methods, differential methods (Lucas-Kanade, Horn-Schunck, Buxton-Buxton, Black-Jepson, variational), cross-correlation, Support Vector Machines, Neural Nets, and the like. Such methods characterize the movement of the spatially distributed data with a vector field. Where spatially distributed data is reduced to a position and/or distribution, the movement is determined by vectors that track the change in the position or distribution. These vectors also provide a vector field.

A next step 112 is determining the behavior of the object or the associated grip conditions. During this step 112, the vector field is reduced to three-dimensional resultant translational and rotational vectors that describe the behavior or movement of the object 16. Methods of combining vectors of a vector field into a translational vector and/or rotational vector include the resultant, curl, and rotor. The resultant vector is the sum of two or more vectors and gives the magnitude and direction of translation of the object 16. The curl or rotor is a vector operator that gives the magnitude and direction of rotation at any point within the vector field. The points belonging to the null space of the curl (rotor) determine the axis of rotation, the sign of each component of the curl (rotor) provides the direction of rotation, and the magnitude of each of the components of the curl (rotor) is the magnitude of rotation. The direction and magnitude of the translation and rotation of the object 16 provides information that is used to control and confirm the desired behavior of the object 16 during sophisticated handling procedures and facilitates understanding of undesired behavior of the object 16 in order to generate instructions for actuating the gripper 10 to stop the undesired behavior. The instructions for controlling are generated according to method 200 described in further detail below. The details of the behavior of the object 16 facilitate generating sophisticated instructions for controlling the behavior of the object 16 through control of the gripper 10.

Continuing with FIG. 1, the gripper control equipment 54 is configured to control the gripper 10 according to instructions generated by the computing unit 52. The instructions are generated by the computing unit 52 in response to grip conditions or object behavior and are converted by a control interpreter 66 into signals that are used to drive the servomotor 20. The control interpreter 66 translates high level control commands into low level control commands for execution. The low level control commands are matched to the signal conditioning required by the servomotor 20.

Referring to FIG. 12, an exemplary method 200 of generating instructions for controlling the gripper 10 is described. According to a first step 202, inputs to a control law are determined. The inputs include the grip conditions or behavior of object 16 and the state of the gripper 10. Grip conditions, in addition to previously mentioned grip conditions, include where an object is in the hand, where no-object is in the hand, and emergency stop when some predefined conditions are met. As used herein, the "state" of the gripper 10 refers to the set of postures and the associated kinematics and dynamics of the gripper 10. Generally described, the set of postures include an open gripper, an opening gripper, a closing gripper, a closed gripper, a gripper posture for grasping small objects, a gripper posture for grasping big objects, a power grip, a gentle grip, a precision grip, a minimum spread grasp, a maximum spread grasp, combinations thereof, and the like. The kinematic model of the gripper 10 describes the motion and actuation of the gripper 10 and focuses on linkage and geometrical actuation. The dynamic model of the gripper 10 describes the time evolution of each part of the gripper 10 with the mass of gripper components taken into account and time constraints satisfied.

The state can be defined by real and virtual parameters such as voltage, current, force, torque, position, velocity, acceleration, pressure, proximity values, electric and magnetic field waves, ultrasonic, combinations thereof, and the like. For example, a power grip is defined as exerting the maximum pressure over the object being grasped. Here, an objective function to maximize the pressure capture by the pressure sensors is to be programmed with its corresponding control law.

The current state is estimated based on current and past time history. For example, in the discrete time sense, a parameter $X_j(T[n])$ that defines the current state $S_m$ at time $T[n]$ could be calculated based on current and past values. Here, n is the time index, m is the state index, and j is the parameter index. Current state estimation can be a function of present and past, e.g., $X_j(T[n])=f(T[n], T[n-1], T[n-2], \ldots)$, and can also be a function of the parameter itself $X_j$ as well as other parameters $X_k$, e.g. $X_j(T[n])=f(X_1, X_2, X_3, \ldots)$. The next state is predicted based on current and past time history. For example, in the discrete time sense, one of the parameters, $X_j(T[n+1])$ that defines the next state $S_{m+1}$ at time $T[n+1]$ can be calculated based on current and past values. The next state prediction can be a function of present and past, e.g. $X_j(T[n+1])=f(T[n], T[n-1], T[n-2], \ldots)$, and can also be a function of the parameter itself $X_j$, as well as other parameters $X_k$, e.g. $X_j(T[n+1])=f(X_1, X_2, X_3, \ldots)$.

The control law is an algorithm stored in the memory 60 and defines the instructions for controlling the gripper 10 based on inputs. For purposes of teaching, the control law is defined at two levels. At a low level, low level signals such as electric signals provide the input and a low level controller calculates the corresponding output. At a high level, human-like commands are given and coded into low level control commands for execution. Traditional control laws, at either low or high levels, include Proportional Integral Derivative (PID), Fuzzy Logic, Artificial Neural Networks, Ladder, Support Vector Machines, Full State Feedback, H Infinity ($H_{inf}$), Linear Quadratic Gaussian (LQG), Linear Quadratic Regulator (LQR), Controlled slip, Non-slip, and Hybrid slip, and the like. Controlled slip refers to intentionally allowing an object that is handled by a gripper to slip in order to change the position or orientation of the object or to control the release of the object on a table or target location. Non-slip refers to actuation of the gripper in order to void any possible motion of the object with respect to the gripper. This control is needed for transportation of goods and objects. Hybrid Slip refers to a combination of non-slip and controlled slip and is used in applications to rotate or spin of a part. Rotation of a coin while holding the coin at all times is an example where no-slip in the axis of rotation together with controlled slip of the edges of the coin is used.

According to a second step 204, the state and the grip conditions or behavior of the object 16 are input into the control law to determine instructions for controlling the gripper 10 to reconcile the desired state and the actual state. In general, instructions include increasing pressure to increase friction, particularly at positions downstream of the translation or rotation direction. The increase in pressure is a function of the magnitude of translation or rotation. Instructions further include increasing pressure at a point that is offset from the axis of rotation. According to a third step 206, the instructions are interpreted and executed.

Exemplary embodiments are now described in further detail. Referring to a first exemplary embodiment illustrated in FIGS. 1-5, the gripper 10 engages an object 16 between the fingers 14a, 14b. At contact points 70a, 70b where the object 16 is in contact with the sensor array 40, the sensor array 40 generates spatially distributed pressure data that is acquired by the data acquisition equipment 50. Data is continuously acquired although, for purposes of teaching, spatially distributed data is shown and described for a limited number of time steps. Referring to FIG. 3, the spatially distributed data for each sub-array 42a, 42b at a time $t_1$ is represented on a two dimensional graph by a cluster of squares or that are highlighted by a border, hereinafter referred to as a footprint 74a, 74b. The highlighted squares that have various pressure magnitudes. The illustrated footprints 74a, 74b represent points of contact or proximity between the object 16 and the gripping surface of the gripper 10. The computing unit 52 receives and processes the footprints 74a, 74b to determine a position 76a, 76b and distributions 78a, 78b from the position 76a, 76b along the x-axis and y-axis.

Referring to FIGS. 3 and 4, the processor 62 executes instructions in the memory 60 to determine the change in the footprints 74a, 74b as a function of the change in the position 76a, 76b at two different times $t_1$, $t_2$. The resulting translational vectors 80a, 80b that extend between the positions 76a, 76b at different times $t_1$, $t_2$ define a vector field. Referring to FIG. 5, the processor 62 executes instructions in the memory 60 to fuse vector field 80a, 80b into a translational vector 82 and a rotational vector 84 that represent the grip conditions or behavior of the object 16. The gripping conditions or behavior of the object 16 are the result of a certain gripping approach that is used to initially engage the object 16 in a certain way or location. The gripping approach and the result of each gripping approach are logged in the memory 60 by the computing unit 52 so that the system 30 can learn and improve the gripping approach for a specific object 16.

Referring to another exemplary embodiment illustrated in FIGS. 6-8, the gripper 10 engages an object 16 in the form of a disc with texture or protrusions. Referring to FIG. 8, various footprints 74 corresponding to contact between the protrusions and the sub-array 42a are shown. Footprints 74a at a first time $t_1$ are shown with a solid border and footprints 74a at a second time $t_2$ are shown with a dashed border. Processor 62 executes instructions in the memory 60 to execute an optical flow method to produce the vector field 80 that represents the movement or displacement of the footprints 74. Here, vectors 80 track the movement of elements of the footprints 74. Processor 62 then executes instructions in the memory 60 to determine the movement of the object 16 as a function of the vector field 80. For cases when complex or dexterous manipulators are used, the end effector kinematics need to be used to determine the relative coordinates of the home position of multiple instances of the sensor array 40. This is necessary in order to calculate the three dimensional resultant force footprint associated with a specific gripping condition under effect.

Referring to another exemplary embodiment illustrated in FIGS. 9 and 10, the gripper 10 has three fingers 14a, 14b, 14c and engages an object 16. A fourth finger 14d is discussed in further detail below with respect to an alternative embodiment. Here, fingers 14a, 14b apply pressure that is greater than that which is applied by finger 14c. For purposes of illustration, the size of the areas of the footprints 74a, 74b is used to represent the magnitude of pressure and the larger areas represent larger pressures. Since the points belonging to the null space of the curl (rotor) are found in footprints 74a, 74b, and in this case correspond to opposite points of contact, the opposed contact points 70a, 70b clearly define an axis of rotation 90 and grip conditions are conducive to rotation. Footprints at two times $t_1$, $t_2$ are illustrated and the processor 62 executes instructions in the memory 60 to determine grip conditions as above. Processor 62 then executes instructions in the memory 60 to generate instructions for controlling the gripper 10 to stop the rotation. The controlling instructions include moving the finger 14c in the y-direction to increase the magnitude of the associated footprint 74c. Another exemplary method of determining grip conditions includes as a first step computationally identifying points of the null space of the curl, and as a second step defining two different points on the rigid object 16 that do not lie on the gripper 10, but that are opposite of each other on the object 16. The two points define an axis of rotation 90 for the rigid object 16.

Continuing with FIGS. 9 and 10, according to another exemplary embodiment, the fourth finger 14d includes the camera 300. The camera 300 is configured to measure spatially distributed data that represents positions on the object 16. Processor 62 executes instructions in the memory 60 to process the images of the camera 300 according to an optical flow method to get a vector field and therefore determine the direction of movement of the gripped object. Processor 62 then executes instructions in the memory 60 to determine the behavior of the object 16 as described herein.

The systems and methods described herein are useful for various objects including rigid bodies and deformable objects. For example, the vector field of a bent flexible wire that is both bending and sliding can be used to compute the curl and the null space of the curl with finite difference techniques to determine that the "axis of rotation" is located where the wire rotates around its middle part, and that rotations in opposite directions occur where the wire bends at its corners.

The above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A method associated with handling an object using a gripper, comprising:
    determining, by a computing unit using a processor, a vector field as a function of change in spatially-distributed data over time, the spatially-distributed data being measured at different positions on the object or on a gripping surface of the gripper by a sensor; and
    determining, by the computing unit, a behavior of the object as a function of the vector field, the behavior of the object comprising at least one vector selected from a group consisting of:
        a translational vector, wherein the translational vector is a resultant vector of the vector field; and a rotational vector, wherein the rotational vector is a curl of the vector field.

2. The method of claim 1, wherein the spatially-distributed data includes a footprint corresponding to an area of sensor excitation.

3. The method of claim 2, further comprising determining a parameter that represents a position of the footprint.

4. The method of claim 3, further comprising determining the vector field as a function of change in the parameter over time.

5. The method of claim 1, wherein the vector field is an optical flow of the spatially distributed data over time.

6. A method associated with handling an object using a gripper, comprising:
   determining, by a computing unit using a processor, a vector field as a function of change in spatially-distributed data over time, the spatially-distributed data being measured at different positions on the object or on a gripping surface of the gripper by a sensor;
   determining, by the computing unit, a behavior of the object as a function of the vector field, the behavior of the object comprising at least one vector selected from a group consisting of a translational vector and a rotational vector; and
   identifying points of a null space of a curl that lie on the object.

7. The method of claim 6, further comprising identifying an axis of rotation as a function of spatial points that lie on opposite sides of the object.

8. The method of claim 7, further comprising controlling the gripper by changing pressure of at least one point of contact that is offset from the axis of rotation.

9. A system, associated with handling an object using a gripper, comprising:
   a sensor configured to measure spatially-distributed data that represents a position of the object that is handled by the gripper;
   a computing unit, comprising:
     a processor;
     a memory having computer-readable instructions that, when executed by the processor, cause the processor to perform steps comprising:
       determining a vector field as a function of change in spatially-distributed data over time, the spatially-distributed data being measured at different positions on the object or on a gripping surface of the gripper by the sensor; and
       determining the behavior of the object as a function of the vector field, the behavior of the object comprising at least one vector selected from a group consisting of:
         a translational vector, wherein the translational vector is a resultant vector of the vector field; and
         a rotational vector, wherein the rotational vector is a curl of the vector field.

10. The system of claim 9, wherein the sensor includes a pressure array.

11. The system of claim 10, wherein the spatially-distributed data includes a footprint corresponding to a point of contact.

12. The system of claim 11, wherein the steps performed by the processor executing the computer readable instructions further comprise determining a parameter that represents a position of the footprint.

13. The system of claim 12, wherein the steps performed by the processor executing the computer readable instructions further comprise determining the vector field as a function of change in the parameter over time.

14. The system of claim 9, wherein the sensor includes a camera.

15. The system of claim 14, wherein the vector field includes an optical flow of the spatially-distributed data over time.

16. The system of claim 9, wherein the steps performed by the processor executing the computer readable instructions further comprise generating instructions for controlling the gripper as a function of the behavior of the object.

* * * * *